United States Patent [19]

De Angelis et al.

[11] 4,393,836

[45] Jul. 19, 1983

[54] SYSTEM FOR THE REGULATION AND CONTROL OF THE ANGLE OF ADVANCE FOR THE IGNITION UNIT OF AN INTERNAL COMBUSTION ENGINE

[75] Inventors: Giancarlo De Angelis, Milan; Alberto Catastini, Corsico; Aldo Bassi; Edoardo Rogora, both of Milan; Dario Radaelli, Legnano; Luciano Bertoloni, Milan; Francesco Perrone, Novara, all of Italy

[73] Assignee: Alfa Romeo, S.p.A., Milan, Italy

[21] Appl. No.: 183,586

[22] Filed: Sep. 2, 1980

[30] Foreign Application Priority Data

Sep. 10, 1979 [IT] Italy .................. 25585 A/79

[51] Int. Cl.³ .......................... F02D 5/00; F02B 3/10
[52] U.S. Cl. .................... 123/417; 123/486

[58] Field of Search ......... 123/414, 416, 417, 418; 364/480, 723, 736

[56] References Cited

U.S. PATENT DOCUMENTS 3,862,404  1/1975  Fiedrich ................. 123/417
4,048,965  9/1977  Bianchi et al. .......... 123/486

Primary Examiner—Raymond A. Nelli
Attorney, Agent, or Firm—Charles E. Brown

[57] ABSTRACT

This invention relates to a system for the regulation and control of the angle of advance in the ignition unit of an internal combustion engine, which is based on the use of a properly programmed microprocessor unit which receives the input data from a set of detectors of engine parameters, processes them and finally delivers output data representative of the regulated magnitude, that is, of the angle of advance.

4 Claims, 2 Drawing Figures

SYSTEM FOR THE REGULATION AND CONTROL OF THE ANGLE OF ADVANCE FOR THE IGNITION UNIT OF AN INTERNAL COMBUSTION ENGINE

It is known that the present day internal combustion engines for motor vehicles are fed with rather lean mixtures and that for the engines in the future the adoption of leaner and leaner mixtures is forecast in order to reduce the fuel consumption and to minimize the content of unburned pollutants in the exhaust gases.

Engines fed with lean mixtures, however, operate under conditions which are more critical than for the engines fed with stoichiometric or even rich mixtures, and possible errors of fuel metering may hinder the combustibility of the mixture. These engines require also ignition units capable of forming between the spark plug electrodes, arcs having an appropriate intensity and duration, with an accurately controlled ignition advance, to prevent partial combustion or even ignition failures of the mixture from occurring.

In order that such requirements may be fulfilled, the adoption of regulation and control units of electronic type is becoming more and more widespread.

The most updated electronic system for regulating the fuel feed and governing the ignition are of the cabled logic type connected to a microprocessor digital logic system, or are of the microprocessor digital logic type exclusively.

In the former type, the timing functions for the regulated magnitudes (injection phasing, ignition phasing) and for the final power stages are made with a cabled logic, whereas the quantification of the regulated magnitudes (duration of the ignition, ignition advance) is obtained with the use of digital techniques which require the calculation of functions and the analysis of tabulated data, and is carried out by a microprocessor which has been purposely programmed.

In the systems of the latter type, only the final power stages are controlled by cabled logic, whereas both the timing functions and the quantification of the regulated magnitudes are carried out by a properly programmed microprocessor unit.

In the systems of the first named type, it is comparatively simple to modify the quantification of the regulated magnitudes to vary the performances of the installation consistently with the requirements of the engine, if the timing relationships remain unaltered, because a variation of the latter generally requires a substantial revision of the design of the cabled logic.

The systems which are entirely controlled by microprocessor digital unit permit an utmost versatility inasmuch both the timing and the quantification of the regulated magnitudes may be varied by modifying the microprocessor program. In addition, from the point of view of the reliability and safety of use, the microprocessor system tender the maximum guarantees since the number of the components is extremely small.

Also from the point of view of the costs, such system proves to be the cheapest since the adoption of highly integrated technologies in the manufacture of the microprocessors considerably reduces the assemblage and production costs.

It is an object of the present invention to provide an electronic control and regulation system for the angle of advance of ignition for an internal combustion engine, which is based on the adoption of a microprocessor unit programmed for executing preselected sequences of operations which, at every calculation cycle, permit it to derive, from the input data composed by the preselected engine operative parameters, the output data which are composed by the regulated magnitudes, that is quantification (numerical value) and timing (phasing) of the ignition advance.

An object of the present invention is to provide a control and regulation system having such an accuracy, reliability and rapidity of response which are adequate to the high performances required of the engine and to the times of development of the engine operations.

Another object of the present invention is to provide a control and regulation system having production costs which are advantageous for mass-production.

The system of regulation and control of the ignition advance according to this invention is provided for the ignition unit of an internal combustion engine comprising the sparking plugs, means for distributing the high voltage to said plugs according to the explosion sequence, generating means for generating high voltages, at least a power stage for driving said generating means, said regulation and control system comprising a first detector of a first engine operative parameter capable of delivering in a discrete number the values taken by said parameter with each of said values being composed by a preselected number of bits, a second detector of a second engine operative parameter capable of delivering in a discrete number the values taken by said parameter with each of these values being composed by a preselected number of bits and, each couple of values of said first and said second parameters identifying a certain operative condition of the engine, a third detector of a working temperature of the engine capable of delivering in a discrete number the values taken from said temperature, with each of these values being composed by a preselected number of bits, a first pulse generator opera-tively conected to an engine mainshaft and being capable of delivering at every revolution of the engine a pulsed signal composed by a number of pulses equal to the number of the ignitions which must be commanded in a revolution of the engine, each of said pulses having a preselected phase angle relationship relative to the top dead center of the individual piston, a second pulse generator operatively connected to a shaft rotated at a speed equal to one half the speed of the mainshaft and capable of delivering a properly phased pulse at every engine cycle, at least a timer having a counting capacity correlated to the desired accuracy, a central microprocessor unit (C.P.U.), a reading and writing storage unit (RAM); a reading only storage unit (ROM) containing calculation program of the microprocessor unit, a preselected control of advance of the ignition of the engine as a function of the two engine operative parameters aforesaid, a preselected control of correction of the ignition advance as a function of a working temperature of the engine, cells of the storage unit (ROM) relative to the preselected control of ignition advance each containing, an information piece comprising a preselected number of bits the value of which is a function of the angle of ignition advance of a sparking plug relative to the piston top dead center in the engine operative condition defined by a combination of values of the two engine operative parameters aforesaid; all the other engine operative parameters being considered to be constant, the number of storage cells being equal to the number of the possible combinations of the values possible from a combustion of a preselected number of most significant bits of the first engine operative parameter with the values taken by a preselected number of most significant bits of the second engine operative parameter, the cells of said storage unit (ROM) relative to the preselected control of correction of the ignition advance each containing, a piece of information the value of which is the ignition advance correction coefficient as a function of the values taken by said engine working temperature, said central microprocessor unit being programmed for generating an address of a reading only storage (ROM), comprising the combination of said preselected number of the first most significant bits of the numerical value taken by said first engine operative parameter with said preselected number of the most significant bits of the numerical value taken by the second engine operative parameter:

for identifying by said address that cell of the reading only storage in which is contained a first information of the angle of advance;

for identifying in said reading only storage in addition to said first information of the angle of advance, three additional piece of information of the angle of advance, each of which corresponds to the contents of the storage cells situated in a predetermined area around said address, each of the three cells being identified by algebraically summing preselected constants in said address;

for obtaining from said four pieces of information of angle of advance of ignition an information of angle of advance calculated by an iterative process of interpolation, the elementary operative module of which utilizes a preselected number of the least significant bits of each of said first and second engine operative parameters;

for identifying in said reading only storage the cell containing the correction coefficient corresponding to the engine working temperature, and for utilizing said correction coefficient to modify according to a preselected procedure said calculated angle of advance information;

for calculating from the information of angle of advance of ignition relative to the piston dead center position, corrected for the temperature, the information of time of delay relative to a first pulse delivered by said first generator, said information of delay time being expressed in the form of a number of constant-frequency pulses;

for identifying the sparking plug on which the spark must occur, through the pulsed signal delivered by said first pulse generator;

for controlling the performance of the stage of control of the high voltage generating means of said sparking plug, so that the same generating means may start the storage of electricity, the instant of time of actuation of said stage being determined through the pulsed signal delivered by said first generator;

for controlling the deactuation of said control stage, so as to have the spark occurring on said sparking plug, as a function of said delay time, utilizing a timer.

More particularly, the microprocessor unit is programmed:

for determining the duration of actuation of said control stage by loading on said timer the number of pulses aforesaid which represents the delay time, and for controlling, on completion of the counting of said timer, the deactuation of said control stage of the high-voltage generating means of said sparking pulg, so as to have the plug delivering its spark.

In the case in which the high-voltage generating means require the control of the current storing time, the microprocessor unit is programmed:

for acquiring, in the form of number of constant-frequency pulses, the time of storage of the preceding cycle correcting it consistently with the power level attained by the high-voltage generating means still in the preceding cycle;

for loading on said timer a number of pulses equal to those of the delay time less the number of pulses corresponding to the current-storage time, controlling said timer so as to have it performing a first counting through the pulsed signal delivered by said first generator;

for controlling, on completion of said first counting by said timer the actuation of the control stage of the high-voltage generating means of said sparking plug, so as to have said generating means starting the storage of current;

for loading on said timer a number of pulses equal to that of said current-storing time, controlling it to perform a second counting step;

for controlling on completion of said second counting step of the timer, the deactuation of the control stage of the high-voltage generating means of said sparking plug, so as to have the spark generated on said sparking plug.

Features and advantages of the invention will be better understood by examining the accompanying drawings of which:

Figure 1:
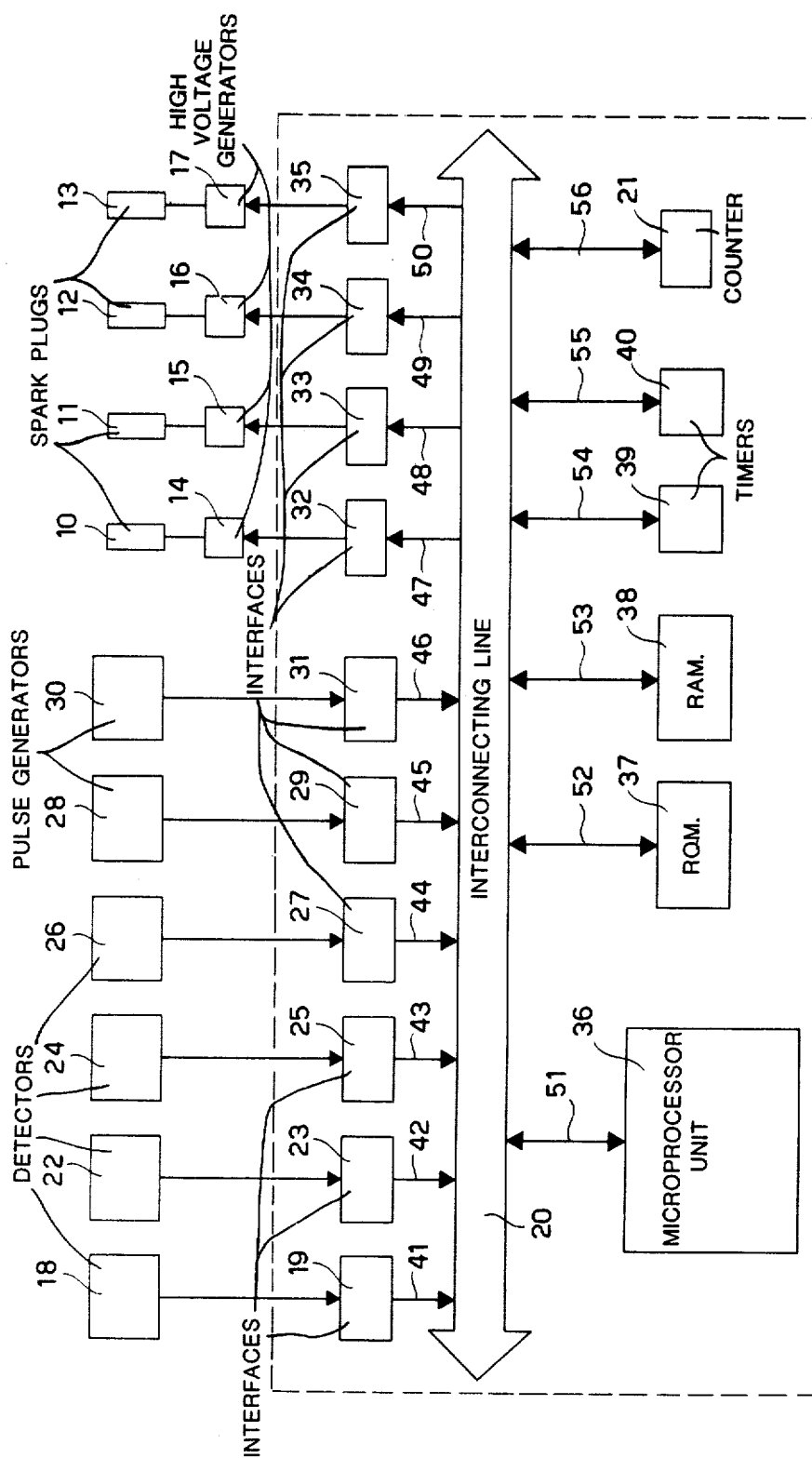
FIG. 1 is a block diagram of a preferred embodiment of the invention.

The regulation and control system for the angle of advance of ignition shown in the block diagram of FIG. 1 is applied to a 4-cylinder, 4-stroke internal combustion engine.

There are indicated at 10, 11, 12, 13 the sparking plugs and at 14, 15, 16, 17 the high-voltage generating means for the same sparking plugs. There is shown at 18 a detector of an engine operative parameter, in the case in point the rotational speed of the engine, which can be, for example, of the kind prescribed in the U.S. patent applications Ser. Nos. 886,438 and 62,481 filed on Mar. 14, 1978 and July 31, 1979 respectively.

The detector 18 is capable of delivering via an interface 19 a pulsed signal the period of which is proportional to the rotational speed of the engine. The interface 19, which is connected through a connection 41 to a parallel interconnection line 20 permits, concurrently each pulse coming from the detector 18, to stop the principal program to make possible the performance of a first auxiliary program, which controls the operation of a counter 21.

The microprocessor unit 36, utilizing the counter 21, detects such a period and delivers in a discrete number the values provided by the rotational speed in the field of operation of the engine: these values are expressed by eight bits.

There is indicated at 22 a detector of another engine operative parameter, in the case in point the angle of the throttle(s) which meter the air drawn in by the engine. The detector 22 is capable of delivering in a discrete number the values provided by the throttle angle throughout the throttle stroke: these values are expressed by eight bits. The detector 22 is connected via an interface 23 and the connection 25 to the parallel interconnection line (bus) 20.

Each operative condition of the engine is identified by a couple of the values of the rotational speed and the throttle angle.

It is indicated at 24 a detector for the temperature of the air drawn in by the engine, and there is indicated at 26 a detector of the temperature of the fluid coolant for the engine, each detector being capable of delivering, via respective interfaces 25 and 27, the values taken from the respective temperatures: these values are expressed by five bits.

Connections 43 and 44 connect the interfaces 25 and 27 to the parallel interconnection line 20.

There is indicated at 28 a pulse generator operatively connected to the engine mainshaft (not shown) and capable of delivering at every revolution of the engine a pulsed signal composed by a number of pulses equal to the number of the ignitions which take place at every revolution of the engine. In the case of a 4-cylinder, 4-stroke engine two pulses for each revolutions are necessary, which are separated by the period of time existing between the ignitions of two consecutive cylinders in the ignition sequential order.

There is indicated at 29 an interface which connects the generator 28 by a connection 45 to the parallel interconnection line 20.

Such interface 29 permits, concurrently with each pulse coming from the generator 28, to stop the principal program to permit the performance of a second auxiliary program for controlling the operation of timers 39 and 40: these latter determine the duration of the waiting time.

There is indicated at 30 a pulse generator, operatively connected to a shaft (not shown) which is rotated at a speed one half that of the engine mainshaft, and capable of emitting an appropriately phased pulse at every cycle of the engine.

An interface indicated at 31 and a connection 46 connect the generator 30 to the parallel interconnection line 20.

The interface 31 permits, concurrently with the pulse coming from the generator 30; to stop the principal program to be able to carry out a first auxiliary program which checks the correct ignition timing.

The high-voltage generating means 14, 15, 16, 17 for the sparking plugs 10, 11, 12, 13 are connected to the parallel interconnection line 20 through electric adaptation and driving interfaces 32, 33, 34, 35 and connections 47, 48, 49, 50.

There is indicated at 37 indicates a reading only storage unit (ROM) connected via a connnection 52 to the parallel interconnection line 20. There is indicated at 38 a reading and writing storage unit (RAM) connected via a connection 53 to the interconnection line 20. The timers 39 and 40 are connected via connections 54 and 55 to the interconnection line 20; the counter 21 is connected via a connection 56 to the interconnection line 20. At 57 there is generally indicated the microcomputer. In the reading and writing storage unit 38 (RAM) there are contained from time to time the values obtained from the detectors and the values to be sent to the spark plug actuators; there are also contained all the values of the intermediate magnitudes generated during the calculation and necessary for the performances of the programmes.

In the reading only storage 37 (ROM) there are contained the principal program, the subprograms thereof and the three auxiliary programs used by the microprocessor unit 36, the ignition advance plan as a function of the rotational speed of the engine and of the angle of the throttle(s), and the plan of correction of the carburation as a function of the temperature of the drawn in air and the plane of correction of the carburation as a function of the temperature of the fluid coolant. In the reading only storage 37 there could also be loaded other plans of correction of the ignition advance, for example as a function of the pressure of the ambient air in a manner not shown.

The storage cells relative to the plan of ignition advance each contain, an information of angle of ignition advance relative to the piston top dead center position composed by eight bits in the operative condition defined by a couple of values of the rotational speed of the engine and of the angle of one or more throttles, all the other parameters of the engine being assumed to be constant. The number of the storage cells is equal to the number of the possible combinations of the values taken by the five most significant bits of the engine rotational speed and the values taken by the five most significant bits of the throttle angle(s). In the case in point the storage cells number 1024, since 32 are the values of rotation speed and 32 are the values of throttle angle taken into consideration.

The storage cells relative to the plan of correction of the angle of advance of the ignition contain, each, an information the value of which, expressed by eight bits represents the correction coefficient of the ignition advance as a function of the values taken by the temperature of the air (drawn in) and, respectively, of the temperature of the engine coolant fluid.

The operation of the regulation and control system described above is as follows.

The microprocessor units acquires, in the first place, the magnitudes which identify the operational status of the engine. More particularly it acquires from the detector 22, via the interface 23, the throttle angle. From the detectors 24 and 26, via the interfaces 25 and 27, it acquires the air temperature and the coolant temperature.

The engine rotational speed is acquired asynchronously relative to the principal programs, by utilizing the pulsed signal coming from the detector 18: more particularly, in correspondence with a first pulse, the microprocessor unit 36 performs the following operations:

it stops the performance of principal program;

it stops and commands the start of the counting of the counter 21; and it restarts the performance of the principal program.

In correspondence with a second pulse, the microprocessor unit 36 performs the following operations:

it stops the performance of the principal program;

it detects the number of pulses totalized by the counter 21, stops the latter and commands it to restart the counting;

it converts the number of totalized pulses into one information of eight bits proportional to the rotational speed, according to the algorythm disclosed in the U.S. patent application Ser. No. 62,481 above-mentioned; and it restarts the performance of the principal program.

The procedure followed starting from the second pulse is repeated for all the subsequent pulses, so that the information of the engine rotational speed is updated every 180 degrees of rotation of the engine mainshaft.

When starting the calculation cycle for the ignition advance, the microprocessor unit 36 forms the storage address by combining the first most significant five bits of the value sent by the detector 22 of the throttle angle and the first most significant five bits of the value sent by the detector 18 of the rotational speed of the engine.

The ten-bit address thus obtained is utilized by the microprocessor unit 36 to identify the cell of the storage unit 37 which is relative to the ignition advance plan and which contains the information of the angle of advance of ignition, that is, a value, $\phi_1$, proportional to the angle of advance of the ignition.

The microprocessor unit 36 identifies also in the same storage unit 37 three additional cells which contain the information of angles of ignition advance, $\phi_2$, $\phi_3$, $\phi_4$, each of which is identified by algebraically summing determined constants to the address relative to the first information $\phi_1$.

The cell address $\phi_2$ is obtained summing one unit to the address of the cell $\phi_1$. The address of the cell $\phi_3$ is obtained by adding 32 units to the address of the cell $\phi_1$, and the address of the cell $\phi_4$, is obtained by adding 33 units to the address of the cell $\phi_1$.

The use of said constants is a consequence of the manner in which the pieces of information are arranged in the storage of the ignition advance plan. The information pieces of ignition advance angle when the throttle angle is constant are grouped in blocks of 32 consecutive cells because there have been utilized the five most significant bits of the throttle angle to form the five most significant bits of the storage address.

Each of the blocks contains information pieces of angle of ignition advance corresponding to increasing values of the engine rotational speed, because there have been utilized the five most significant bits of the rotational speed to form the least significant five bits of the storage address.

The microprocessor unit 36, while prosecuting the performance of its calculation program, derives from the aforesaid four pieces of information of ignition advance angle $\phi_1$, $\phi_2$, $\phi_3$, $\phi_4$, an information of ignition advance angle, calculated, $\phi$, by an iterative interpolation process, which in the elementary operative module utilizes the last three significant bits of the rotational speed and throttle angle delivered by the detectors 18 and 22.

The elementary operative module is repeated three times: the first time it is applied to the values $\phi_1$ and $\phi_2$ and permits the calculation of an intermediate value $\phi_{12}$, by utilizing the three least significant bits of the engine rotational speed; the second time it is applied to the values $\phi_3$ and $\phi_4$ and permits the calculation of an intermediate value $\phi_{34}$, by utilizing the three least significant bits of the rotational speed; the third time it is applied to the values $\phi_{12}$ and $\phi_{34}$ and permits the calculation of an intermediate value $\overline{\phi}$ by utilizing the three least significant bits of the throttle angle.

One of the elementary operative modules utilized consists in multiplying a first information of angle of advance of ignition ($\phi_1$, or $\phi_3$, or $\phi_{12}$) by the complement to eight of the three least significant bits and in multiplying the secodnd information of angle of advance of ignition ($\phi_2$, or $\phi_4$, or $\phi_{34}$) by the value of the three least significant bits; the two products thus obtained are summed together and divided by 8.

The exploitation of the interpolation procedure described permits the having of information available of the ingnition advance in a number equal to the number of the possible combinations of the values taken by the number of bits of the rotational speed of the engine and of the values taken by the number of bits of the throttle angle, by utilizing a reading only storage of a lesser capacity, equal to 1/64 of the capacity which would be necessary to store all said combinations.

The value of the air temperature (five bits) obtained from the detector 24 is utilized by the microprocessor unit to address a table of 32 values contained in the reading only storage: the cells of this table contain the coefficients of correction of the fuel metering calculated as a function of the temperature. By so doing, there is determined the coefficient of correction relative to the air temperature, $C_{TA}$.

By a similar procedure there is determined the correction coefficient relative to the temperature of the cooling water, $C_{TH}$.

The central microprocessor unit 36 carries out the correction by multiplying the calculated value $\overline{\phi}$ by the sum of the various correction coefficients and summing the increase of values thus obtained with the value $\overline{\phi}$; there is thus obtained a value of ignition advance angle which is corrected, $\overline{\phi}_c$.

To simplify the multiplication, such coefficients are expressed in percentage on a base of 128.

The microprocessor unit 36 utilizes the information of angle of advance of ignition $\overline{\phi}_c$ for calculating an information of delay time $t_r$ relative to a first pulse delivered by the generator 28. This delay time information is expressed in terms of number of constant frequency pulses, for being a function of the number of constant frequency pulses totalized in the period of time running between said first pulse and the immediately preceding pulse.

One of the functions of the microprocessing unit which can be exploited consists in transforming the angle of ignition advance relative to the top dead centre, $\overline{\phi}_c$, into a delay angle $\phi_r$, relative to the pulse coming from the generator 28 which immediately precedes the top dead centre. Such a conversion is obtained by summing a preselected constant, K, to the angle of ignition advance $\overline{\phi}_c$. From the delay angle $\phi_r$ thus obtained, one has, by dividing it by the angle of rotation of the engine comprised between said first pulse and the immediately preceding pulse, an adimensional coefficient which, multiplied by said number of constant frequency pulses totalized in the period of time which runs between said first pulse and the immediately preceding pulse, constitutes the number of constant frequency pulses which represents said delay time $t_r$.

The calculation of said delay time is performed by the microprocessor unit 36 continually and is asynchronous with respect to the timing signals delivered by the generators 28 and 30.

The delay time information at any rate is updated at least once in the period of time running between two consecutive ignition demands.

The timing of the ignition advance is controlled by the microprocessor unit 36 by the performance of the auxiliary programs bound to the demands of interruption coming from the generators 28 and 30.

In correspondence with each pulse coming from the generator 28, the microprocessor unit performs the following operations:

it stops the principal program;

it identifies the sparking plug in which the spark must take place; this is obtained because the microprocessor unit maintains a counting of the pulses coming from the same generator 28 and resets said counting in correspondence with the pulse coming from the generator 30;

it energizes the control stage of the high-voltage generating means of the spark plug concerned so that the same high-voltage generating means may start the storage of the electricity;

it presets a time (39 or 40) so that it counts the number of pulses defined by the principal program and which represents the delay time;

commands the so preset timer to perform the counting and restarts the performance of the principal program.

As soon as the preselected timer completes the counting, the microprocessor unit performs the following operations:

it stops the performance of the principal program;

it de-energises the control stage of the high-voltage generating means of the spark plug concerned so as to have the spark occurring on the same spark plug; and restarts the performance of the principal program.

In the case in which the high-voltage generators require the control of the electricity storage time so as better to exploit their power characteristics, the regulation and control system of this invention is capable of effecting these functions as follows: in correspondence with each pulse coming from the generator 28, the microprocessor unit effects the following operations:

it stops the principal program;

it identifies the sparking plug on which the spark must be produced, as described above;

presets a timer so that the latter counts a number of pulses equal to those of the delay time less the number of pulses corresponding to said electricity storage time;

commands the so preset timer to perform a first counting, and restarts the performance of the principal program.

As soon as the preselected timer terminates the first counting, the microprocessor unit performs the following operations:

it stops the principal program;

it activates the control stage of the high-voltage generating means of the spark plug concerned so that said generating means may start the storage of electricity;

loads the preselected timer with a number of pulses equal to those of said electricity storage time, that is, equal to those of the balance of the delay time, and restarts the principal program.

As soon as the timer completes this second counting the microprocessor unit performs the following operations:

it stops the principal program;

it de-energizes the control stage of the high-voltage generating means of the spark plug concerned so as to produce a spark on said sparking plug; and restarts the performance of the principal program.

The time of electricity storage of the high-voltage generating means is detected by the microprocessor by reading the number of constant-frequency pulses totalized on a counter between the instant of start of electricity storage and the completion of said storage in the preceding engine cycle and keeping into account the energy level attained by the high-voltage generating means still in the preceding cycle, to prearrange a correction of the same detected storage time so as to have always the maximum of electricity in storage.

The counter of the electricity storage time can be the same counter 21 on which the reading can be taken "in flight", that is, without any necessity of stopping the counter itself.

The regulation and control system of this invention is widely independent of the time of microprocessor unit used and of the characteristics of its peripheral members such as storages, timers, interfaces, because the programming of the same unit has been made having the maximum generality of use in mind.

Figure 2:
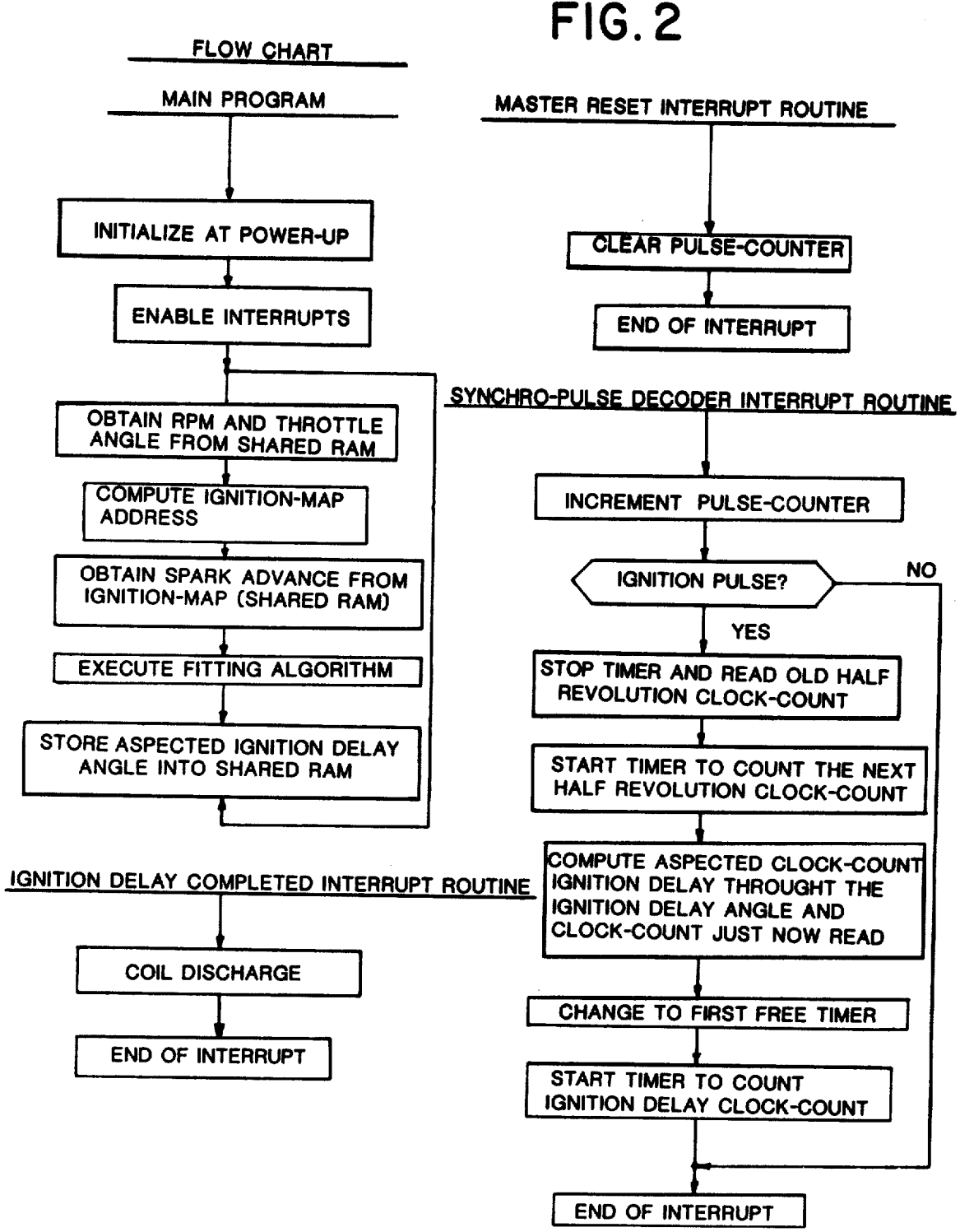
FIG. 2 is a flow chart illustrating the operating steps of the engine control.

The operation of the control system as set forth above is clearly shown in the flow chart of FIG. 2.

We claim:

1. System of regulation and control of an ignition advance for an ignition unit of an internal combustion engine, the engine comprising a mainshaft, engine sparking plugs, means for generating high-voltages, means for distributing said high-voltage to said sparking plugs according to an explosion sequence, at least a power stage for driving said high voltage generating means, said regulation and control system comprising a first detector of a first engine operative parameter capable of delivering in a discrete number values provided by said first parameter, each of said values comprising a preselected number of bits; a second detector of a second engine operative parameter capable of delivering in a discrete number values provide by said second parameter, each of said values of said second parameter comprising a preselected number of bits; each combination of the values of said first and second parameters identifying a preselected operative condition of said engine; a third detector for detecting a working temperature of said engine and being capable of delivering in a discrete number values provided by said working temperature, each of said values of said working temperature comprising a preselected number bits; a first pulse generator operatively connected to said engine mainshaft and being capable of delivering at every revolution of said engine mainshaft a pulse signal comprised of a number of pulses equal to the number of ignition events which must be commanded in a revolution of said engine, each of said pulses having a preselected phase angle relationship relative to the engine top dead center; a second pulse generator operatively connected to a second engine shaft rotated at a speed equal to one half the speed of said engine mainshaft and being capable of delivering a properly phased pulse at every engine cycle; a central microprocessor unit (C.P.U.); a reading and writing storage unit (RAM); a plural storage cell reading only storage unit (ROM) containing calculation programs of said microprocessor unit, a preselected controlled advance of said ignition of said engine as a function of said two engine operative parameters, a preselected control of correction of said ignition advance as a function of said working temperature of said engine; said storage cells of said storage units (ROM) relative to said preselected control of ignition advance each containing an information piece comprised of a preselected number of bits, the value of which is a function of an angle of ignition advance of a selected sparking plug relative to said piston top dead center position in the operative condition defined by a combination of said values of aforesaid two engine operative parameters, and all the other engine operative parameters being considered to be constant; the number of said storage cells being equal to the number of the possible combinations of values provided by a preselected number of most significant bits of said first engine operative parameter with values provided by a preselected number of most significant bits of said second engine operative parameter; said cells of said storage unit (ROM) relative to said preselected control of correction of said ignition advance each containing a piece of information the value of which is an ignition advance correction coefficient defined as a function of said values provided by said engine working temperature; said system comprising at least one timer operatively connected to said central microprocessor unit (C.P.U.) and to said at least one power stage; said central microprocessor unit being programmed for generating an address of said reading only storage (ROM), including the combination of said preselected number of said first most significant bits of said value provided by said first engine operative parameter with said preselected number of said most significant bits of said value provided by said second engine operative parameter forming means for:

identifying by said address that storage cell of said reading only storage in which is contained a first information of said angle of ignition advance;

identifying in said reading only storage in addition to said first information of said angle of ignition advance, three additional pieces of information of said angle of ignition advance, each of which pieces of information corresponds to the contents of said storage cells situated in a predetermined area around said address, each of said three storage cells being identified by algebraically summing preselected constants to said address;

obtaining from said four pieces of information of said angle of advance of ignition an information of angle of ignition advance calculated by an iterative process of interpolation, an elementary operative module of which utilizes a preselected number of said least significant bits of each of said first and second engine operative parameters;

identifying in said reading only storage the storage cell containing said correction coefficient corresponding to said engine working temperature, and for utilizing said correction coefficient to modify according to a preselected procedure said calculated angle of ignition advance information;

calculating from said information of angle of advance of ignition relative to said piston top dead center position; corrected for said engine temperature, information of delay time relative to a first pulse delivered by said first pulse generator, said information of delay time being expressed in the form of a number of constant-frequency pulses;

identifying the sparking plug on which said spark must occur, through said pulsed signal delivered by said first pulse generator;

controlling actuating of said power stage of said high voltage generating means of said identified sparking plug utilizing said timer, so that the same high voltage generating means may start the storage of electricity, the instant of time of actuation of said power stage being determined through said pulsed signal delivered by said first pulse generator; and controlling the deactuation of said power stage so as to have said spark occurring on said identified sparking plug as a function of said delay time utilizing said timer.

2. System of regulation and control according to claim 1, characterized in that said microprocessor unit is operatively connected to said timer and to said power stage to form means for:

determining the duration of actuation of said power stage by loading on said timer a number of pulses which represents said delay time, and controlling on completion of said counting of said timer deactuation of said power stage of said high-voltage generating means of said identified sparking plug, so as to have said identified sparking plug delivering its spark.

3. System of regulation and control according to claim 1, characterized in that said microprocessor unit is operatively connected to said timer and to said power stage to form means for:

acquiring in the form of a number of constant frequency pulses the time of storage of a preceding cycle correcting it consistently with the power level attained by said high-voltage generating means still in the preceding cycle;

loading on said timer a number of pulses equal to those of said delay time less the number of pulses corresponding to said current-storage time, controlling said timer so as to have it performing a first counting through said pulses signal delivered by said first pulse generator;

controlling on completion of said first counting by said timer the actuation of said power stage of said high-voltage generating means of said identified sparking plug so as to have said generating means starting the storage of current;

loading on said timer a number of pulses equal to that of said current-storage time controlling it to perform a second counting step; and controlling on completion of said second counting step of said timer the deactuation of said power stage of said high-voltage generating means of said identified sparking plug so as to have the spark generated on said identified sparking plug.

4. Regulation and control system according to claim 1, characterized in that said microprocessor unit is operatively connected to said timer and to said power stage to form means for:

calculating the number of constant-frequency pulses which represents said delay time as a function of the information of said angle of advance of ignition relative to said piston top dead center location thermally corrected and of the number of constant-frequency pulses totalized in the period of time which runs between said first pulse and the immediately preceding pulse delivered by said first pulse generator, converting said angle of advance of ignition relative to said engine top dead center position into an angle of delay relative to the pulse which immediately precedes said top dead center position by a predetermined constant which is summed to said angle of ignition advance, dividing said delay angle by the angle of rotation of said engine between said first pulse and said immediately preceding pulse to obtain an adimensional coefficient, and multiplying said adimensional coefficient by said number of constant-frequency pulses totalized in the period of time which runs between said first pulse and said immediately preceding pulse delivered by the first pulse generator.

* * * * *